United States Patent

Spain

[11] Patent Number: 6,056,195
[45] Date of Patent: May 2, 2000

[54] METHOD AND APPARATUS FOR PRINTING BAR CODED LABELS IN DIFFERENT LANGUAGES

[76] Inventor: Wanda Hudgins Spain, 850 Dogwood Rd., Suite A-400-625, Lawrenceville, Ga. 30044

[21] Appl. No.: 08/997,434

[22] Filed: Dec. 23, 1997

[51] Int. Cl.[7] .............................. G06F 3/12; G06F 15/12
[52] U.S. Cl. ......................... 235/432; 235/487; 235/494; 358/1.18
[58] Field of Search .................................... 235/383, 432, 235/487, 494, 462.01; 283/46; 358/1.18

[56] References Cited

U.S. PATENT DOCUMENTS

| | | | |
|---|---|---|---|
| 4,587,411 | 5/1986 | Obstfelder et al. | 235/432 X |
| 5,375,680 | 12/1994 | Ikeda et al. | 235/383 X |
| 5,621,864 | 4/1997 | Benade et al. | 358/1.18 |
| 5,635,698 | 6/1997 | Terada | 235/462.01 |
| 5,737,504 | 4/1998 | Yamada | 358/1.18 |
| 5,848,202 | 12/1998 | D'Eri et al. | 235/375 X |
| 5,939,700 | 8/1999 | Ackley | 235/462.01 |

OTHER PUBLICATIONS

"DataCal KeyMapper Version 2.1", http:\\www.datacal.com/catalog/wfont/35054.htm, copyright 1998 no month available.

Pages of Label Matrix for Windows Copyright 1997 (No month available).

"Reading Between the Lines", By Eric E. Cohen, Journal of Accountancy, Aug. 1994.

*Primary Examiner*—Donald Hajec
*Assistant Examiner*—Jared J. Fureman
*Attorney, Agent, or Firm*—Needle & Rosenberg, P.C.

[57] ABSTRACT

An apparatus for printing bar coded labels employs a computer that includes an acutal keyboard having a plurality of keys and a video display and is programmed to run a bar code label design tool. The label design tool displays on a first portion of the video display a label image having dimensions corresponding to a preselected label type. The label design tool also generates and displays on the label image a bar code that encodes a preselected set of data. The bar code is generated according to a bar code standard selected from a plurality of bar code standards. The bar code label design tool also allows a user to enter text onto the label image. A key mapper displays on a second portion of the video display, different from the first portion, a keyboard image. The keyboard image includes images of letters, arranged in the way that they would appear on the actual keyboard. The letters are in a selected language font selectable from a plurality of language fonts and displayed on images of key locations that correspond to the keys of the actual keyboard. The key mapper is capable of controlling entry of text on the label image so that when a key on the actual keyboard, corresponding to a key location showing a letter in the selected language font, is depressed, the label image will include the letter in the selected language appearing on the corresponding key location. A printer prints the label image on a blank label.

20 Claims, 5 Drawing Sheets

METHOD AND APPARATUS FOR PRINTING BAR CODED LABELS IN DIFFERENT LANGUAGES

BACKGROUND OF THE INVENTION

1. Field of the Invention

This invention relates to label printing systems. More particularly, this invention relates to a method and apparatus for printing bar code labels in several different languages.

2. The Prior Art

Bar code labels are a necessary component in the automatic identification industry and are prevalent in every area of modern commerce and government. Many bar code labels include text that allows users to understand relevant information about the thing that is being labeled, without the use of a bar code scanner. Because an item labeled with a bar code label may pass through several countries or may be read by different people who understand different languages, many bar code labels must be printed with text in more than one language.

As shown in FIG. 1A, one of the most common bar code label types is the Universal Product Code (UPC) label 1, which is commonly applied to almost any kind of merchandise. UPC labels comprise a bar code 2 identifying a product and often include text describing the goods being sold. If the market for the goods includes people who understand more than one language, then the retailer has a competitive advantage if its UPC labels include descriptive text written in the language of the customers. For example, a Chinese foods market in the United States would have an advantage if its UPC labels included both text written in English 3 and text written in Chinese characters 4.

Compliance labels 5 are bar code labels applied to goods that comprise information necessary to meet a standard issued by a government or a business. For example, major retailers have issued standards for label format and content that must be met by any supplier that hopes to do business with the retailer. Also, many governments have issued standards for compliance labels to be applied to all goods entering their respective countries to help prevent smuggling. Businesses involved in international distribution must meet standards issued by both the retailers receiving goods and the governments to which the goods are exported.

Many compliance label standards require information in text and bar coded information that allows for use of an automated identification system. Such standards often require that each unit of merchandise be labeled with a label that includes: a description of goods being shipped in the language of the country from which the goods are being shipped, a description of goods in the language of the country to which the goods are being shipped, a first bar code that includes a serial number of the goods and a bar code that includes information regarding shipping instructions. For example, one wishing to supply a retailer in the Ukraine with goods may be required to ship the goods under a label that includes a description of the goods in English, a second description of the goods in Ukrainian (in the Cyrillic alphabet), a bar code that includes the retailer's serial number and a bar code that includes instructions for shipping the goods to the retailer's distribution point.

A shown in FIG. 1B, a complex compliance label 5 for shipping dolls to Israel might include a UPC bar code 6 for identifying a product, a second bar code 7 (in a second bar code standard such as code 3 of 9, shown here) encoding shipping information, descriptive Hebrew text 8 and similar text 9 in English. As will be appreciated, there are many different standards for compliance labels, many of which are quite complex.

Current bar code label printing systems display an image of a bar code label on a screen. The user selects format options and enters necessary information, which is displayed on the label. Once the user is satisfied with the appearance of the label on the screen, a print instruction is given to the system, which prints the label. Existing systems allow for printing in only one language. Adding another language to the system requires customization of the system, and then every label generated by the customized system will include the additional language.

Current systems do not allow the user to select from several languages when generating the label. For example, if an exporter needed bar code labels for items being exported to Russia, custom bar code printing software would have to be generated that would allow the user to print bar code labels using the Cyrillic alphabet. Such software would not allow the exporter to select another language, for example Mandarin. If the exporter received an order from China requiring bar code labels in Mandarin, the exporter would have to have its label printing system custom adapted to handle Mandarin. Thus, the prior art has the disadvantage that changing languages is costly, time consuming and inefficient.

Many organizations required to use compliance labels with text in a language not supported by their bar code label printing system will first print text in the non-supported language (e.g., Ukrainian) using a word processor onto a blank piece of paper. The text will then be copied onto label blanks using an ordinary copier. Then the label blanks are run through a bar code printer that applies the bar code and any required text in the language (e.g., English) supported by the bar code label printing system. This process has the disadvantages of being costly and prone to error.

Nowhere does the prior art disclose a method or apparatus for printing bar coded labels that allows the user to generate text in a plurality of language fonts.

SUMMARY OF THE INVENTION

The above-noted disadvantages of the prior art are overcome by the present invention, which in one aspect is an apparatus for printing bar coded labels, such as compliance labels. A computer, that includes an actual keyboard having a plurality of keys and a video monitor, or other video display, is programmed to run a bar code label design tool. The label design tool displays on a first portion of the video monitor a label image having dimensions corresponding to a preselected label type. The label design tool also that generates and displays on the label image a bar code that encodes a preselected set of data. The bar code is generated according to a bar code standard selected from a plurality of bar code standards. The bar code label design tool also allows a user to enter text onto the label image. A key mapper displays on a second portion of the video monitor, different from the first portion, a keyboard image. The keyboard image includes images of letters, arranged in the way that they would appear on the actual keyboard. The letters are in a selected language font selectable from a plurality of language fonts and displayed on images of key locations that correspond to the keys of the actual keyboard. The key mapper is capable of controlling entry of text on the label image so that when a key on the actual keyboard, corresponding to a key location showing a letter in the selected language font, is depressed, the label image will include the letter in the selected language appearing on the corresponding key location. A printer that is operationally coupled to the computer prints the label image on a blank label.

In another aspect, a label design tool that allow a user to select a bar code standard from a plurality of bar code standards and enter into a computer data to be encoded as a bar code in accordance with the selected bar code standard. The bar code is displayed in a first preselected location of a preselected portion of a screen having dimensions corresponding to a preselected label type. A program allows the user to select a language font from a plurality of language fonts and enter a first set of text into the computer. The computer displays the first set of text in the selected language font on a second preselected location, different from the first preselected location, of the portion of the screen. A printer prints a label, comprising the bar code and the first set of text, so as to resemble the preselected portion of the screen.

In yet another aspect, the invention is a method of printing bar coded labels, in which a bar code standard is selected from a plurality of bar code standards. Data to be encoded as a first bar code in accordance with the selected bar code standard is entered into a computer and the first bar code is displayed in a first preselected location of a first portion of a screen having dimensions corresponding to a preselected label type. A first language font is selected from a plurality of language fonts and a first set of text is entered into the computer. The first set of text in the first language font is displayed on a second preselected location, different from the first preselected location, of the portion of the screen.

An advantage of the invention is that it allows for the design and printing of bar coded labels that include text in several different languages.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1A:
FIGS. 1A and 1B are prior art examples of bar coded labels comprising text in more than one language.
Figure 1B:
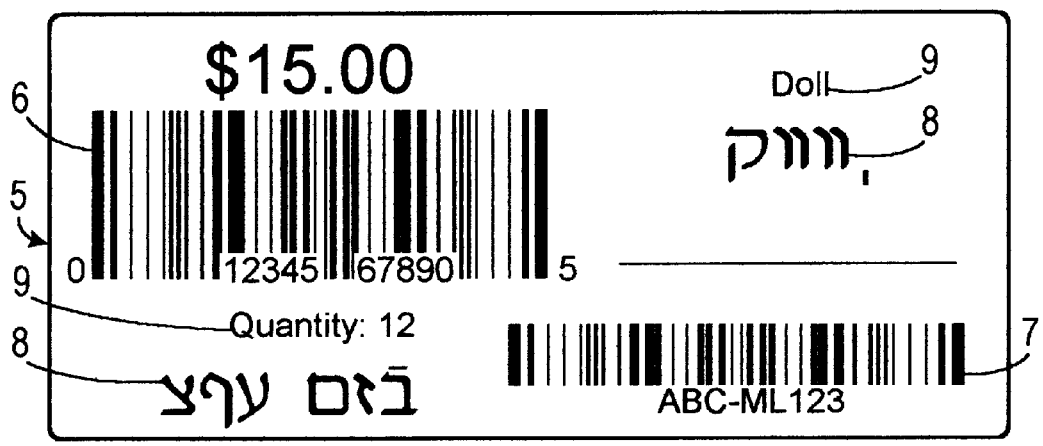

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also, as used in the description herein and throughout the claims that follow, the meaning of "in" includes "in" and "on" unless the context clearly dictates otherwise. Also, as used herein, the term "label" also includes tags and any other bar coded identification of a product that can be applied to the product or its packaging.

Figure 2A:
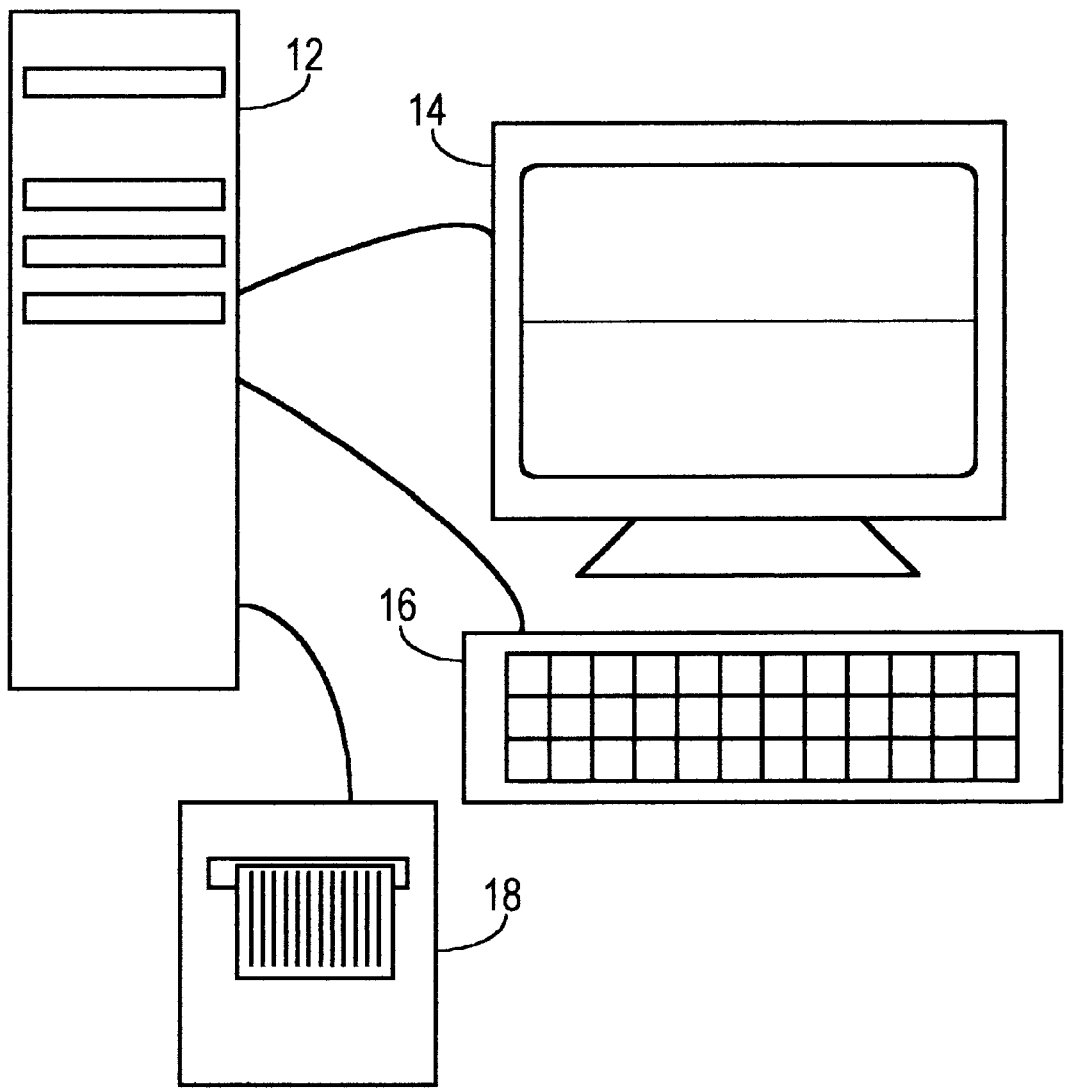
FIG. 2A is schematic diagram of the hardware configuration of an embodiment of the invention.

As shown in FIG. 2A, the hardware used in with the invention includes a computer 12 coupled to a video monitor 14, a keyboard 16 and a printer 18, such as a thermal printer. Other printers, such as ink jet printers work with the present invention. However, thermal printers are most commonly used in printing bar code labels because they generate lines that are more easily read by bar code scanners. Data entry may be accomplished through the keyboard 16, or through other conventional means, such as a mouse or through a data transmission to the computer 12.

Figure 2B:
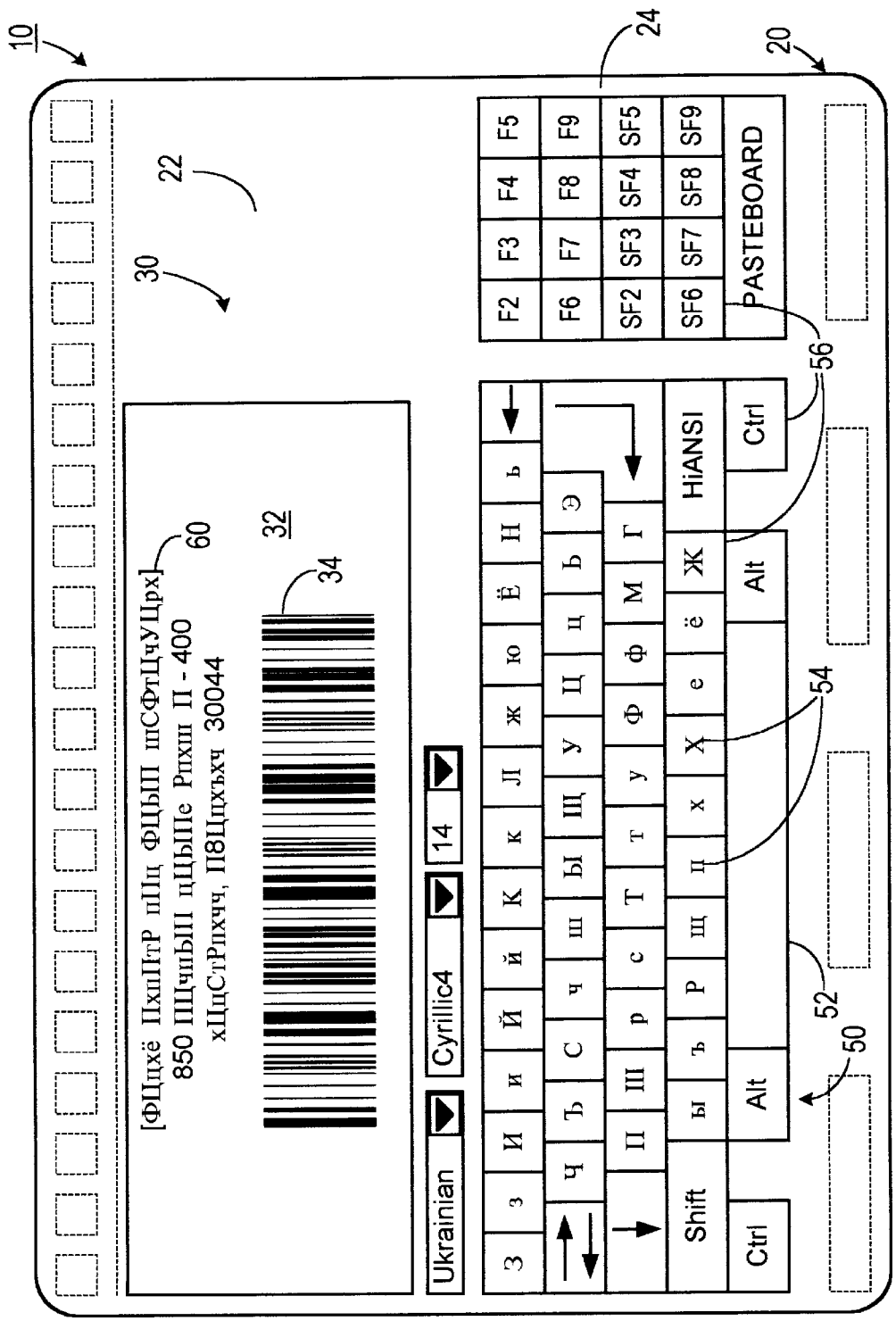
FIG. 2B is a view of a video monitor screen displaying a bar code label design tool and a key mapper.

As shown in FIG. 2B, the present invention 10 provides to the user the ability to print bar code labels having text in a language font selected from a plurality of language fonts. In one embodiment, the invention runs on the computer 12 running Microsoft WINDOWS®.

The computer 12 displays information on a video monitor screen 20, which may be divided into a first portion 22 and a second portion 24. The first portion 22 displays a bar code label design tool 30 that displays a label image 32 that generally has dimensions corresponding to a selected label type. The label design tool 30 displays a bar code 34 that is presented in a bar code standard selected by the user and that encodes data input by the user. The label design tool also displays text 60 input by the user.

A key mapper 50 displays a keyboard image 52 in the second portion 24 of the screen 20. The keyboard image 52 includes images of letters 54 disposed on key locations 56 that correspond to key locations of an actual keyboard (not shown). Thus, when the user depresses a key on the actual keyboard, a letter in the selected language font appears in the text 60 of the label image 32.

Figure 3:
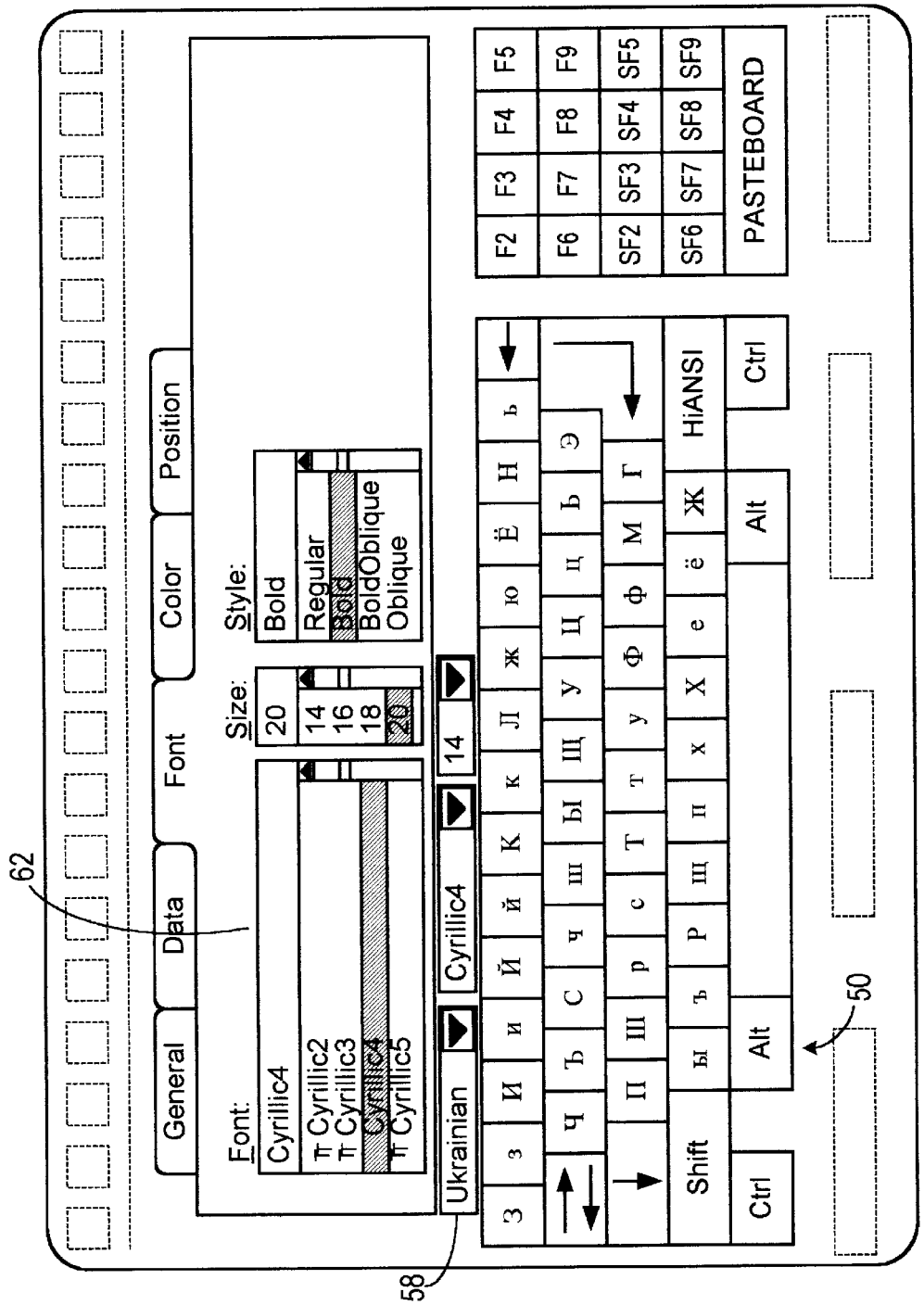
FIG. 3 is a view of a screen displayed in accordance with the invention, where a language font may be selected.

As shown in FIG. 3, the key mapper 50 comprises a data entry screen 62, or other type of data entry capability, provides a menu 58 for selecting a language and a menu 62 that displays the fonts available for the selected language. The user selects the language and then the desired corresponding language font.

In a preferred embodiment, the label design tool is LABEL MATRIX™, from StrandWare, Inc., 1529 Continental Drive, Eau Claire, Wis. 54702 and the key mapper is WORLDFONT™ PRO FOR WINDOWS®, from DataCal Corp., 531 East Elliot Rd., Chandler, Ariz. 85225. The hardware requirements for this embodiment include an IBM®—compatible 486, or above, personal computer running WINDOWS® 3.1, or above, having at least 8 MB RAM (16 MB recommended) and 10 MB hard disk space. Although a preferred embodiment is disclosed, it is understood that scope of the claims extends to other hardware systems, including MACINTOSH® systems, UNIX® systems and DOS-based systems. It is further understood that the scope of the claims is not limited to the specific key mapper and label design tool disclosed as part of this preferred embodiment, but extends to any bar code label design tool having the ability to display an image of a bar code label and to any key mapper that displays an image of a key board having letters in a desired font mapped onto the images of keys on the image of the keyboard.

Figure 4:
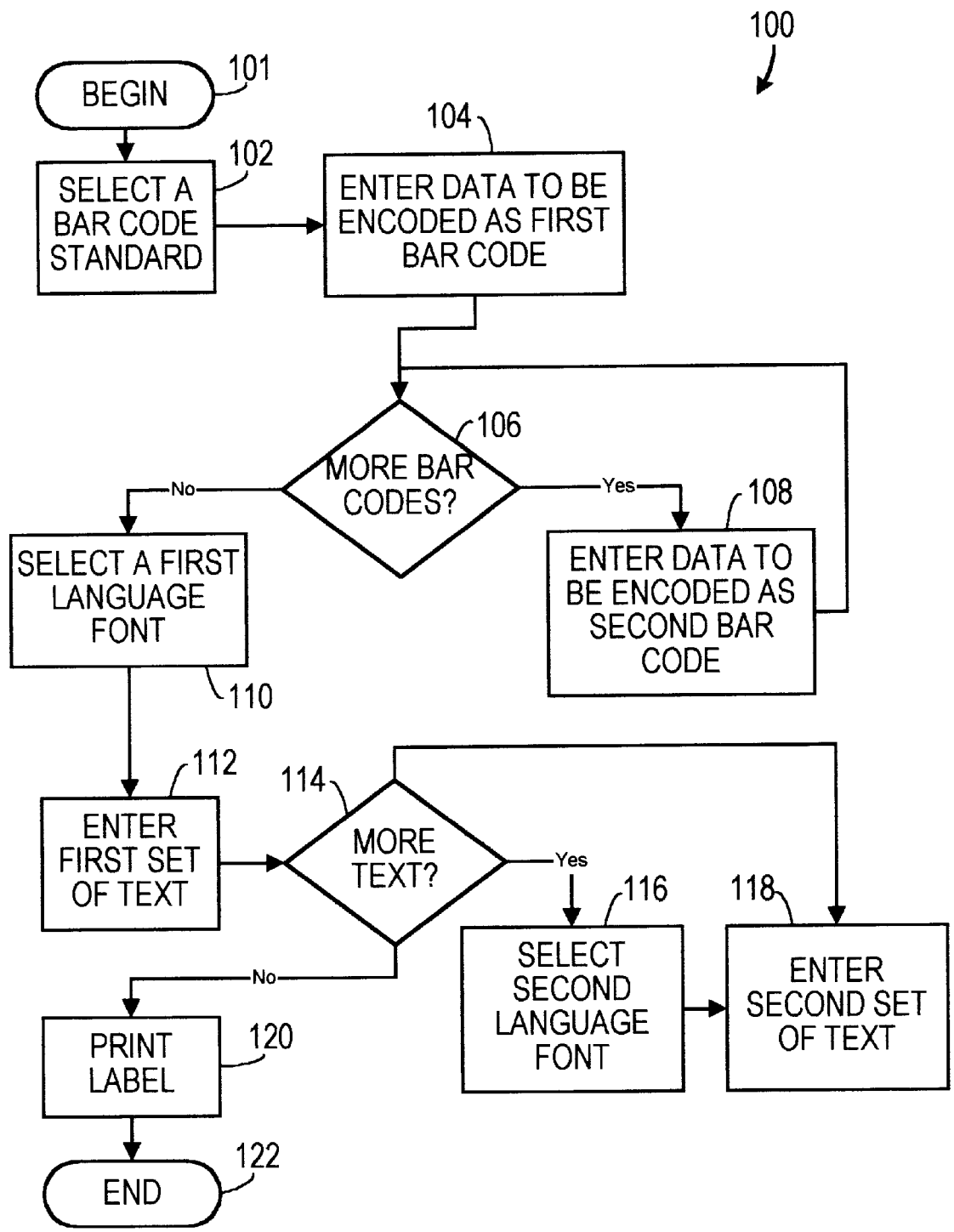
FIG. 4 is a flow chart describing the method of the invention.

As shown in FIG. 4, a flow chart 100 demonstrating the method of the invention starts with an entry 101 into the computer system disclosed above, which may include operating system and program initialization. The user selects a bar code standard 102 and enters data 104 to be encoded as a bar code. The user also selects placement of the bar code on the label image by dragging the bar code with a mouse, or other positioning tool. The user determines if more bar codes are to be entered 106 and enters additional bar codes if so. Otherwise, the user selects a language and corresponding language font 110 and enters text and positions the text on the label image. The user determines 114 if other text units are required and selects a second language font 116 and enters the second set of text 118, if necessary. Otherwise, if the label image is satisfactory, the user issues a print command 120 to print the bar code label. The user then may design other bar code labels or end 122 the session. It will be readily appreciated that the order in which bar code entry and text entry are executed may be switched without departing from the scope of the invention.

The above described embodiment is given as an illustrative example only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. An apparatus for printing bar coded labels, comprising:
   a. a computer, including an actual keyboard having a plurality of keys and a video display, that is programmed to execute:
      i. a bar code label design tool that displays on a first portion of the video display a label image having dimensions corresponding to a preselected label type and that generates and displays on the label image a bar code that encodes a preselected set of data, the bar code being generated according to a bar code standard selected from a plurality of bar code standards, the bar code label design tool also allowing a user to enter text from the actual keyboard onto the label image; and
      ii. a key mapper that displays on a second portion of the video display, different from the first portion, a keyboard image that includes images of letters, in a selected language font selectable from a plurality of language fonts, displayed on images of key locations that correspond to the keys of the actual keyboard, the key mapper capable of controlling entry of text on the label image so that when a key on the actual keyboard, corresponding to a key location showing a letter in the selected language font, is depressed, the label image will include the letter in the selected language appearing on the corresponding key location; and
   b. a printer, operationally coupled to the computer, that is capable of printing the label image on a blank label.

2. The apparatus of claim 1, wherein the data encoded by the bar code is received by the computer from the keyboard.

3. The apparatus of claim 1, wherein the key mapper executes:
   a. a data entry capability that allows a user to select a language from a plurality of languages; and
   b. a program that indicates to the user the allowable language fonts that are allowed for the selected language.

4. The apparatus of claim 1, wherein the printer is a thermal printer.

5. A computer system, coupled to a video display and a printer, for printing bar coded labels, comprising:
   a. means for selecting a bar code standard from a plurality of bar code standards;
   b. means for entering into a computer data to be encoded as a bar code in accordance with the selected bar code standard;
   c. means for displaying the bar code in a first preselected location of a preselected portion of a video display having dimensions corresponding to a preselected label type;
   d. means for selecting a language font from a plurality of language fonts;
   e. means for entering a first set of text into the computer;
   f. means for displaying the first set of text in the selected language font on a second preselected location, different from the first preselected location, of the portion of the video display; and
   g. means for printing a label, comprising the bar code and the first set of text, so as to resemble the preselected portion of the video display.

6. The apparatus of claim 5, wherein the means for selecting a bar code standard comprises a pull-down menu displayed by a computer that lists each bar code standard of the plurality of bar code standards.

7. The apparatus of claim 5, wherein the means for displaying the bar code in a first preselected location comprises a computer running a bar code label design tool.

8. The apparatus of claim 5, wherein the means for selecting a language font comprises:
   a. a data entry capability that allows a user to select a language from a plurality of languages; and
   b. a computer running a program that indicates to the user the allowable language fonts that are allowed for the selected language.

9. The apparatus of claim 8, wherein the data entry capability comprises a pull down menu displayed by the computer listing each language of the plurality of languages.

10. The apparatus of claim 8, further comprising a pull-down menu displayed by the computer listing each language font of the plurality of language fonts that are allowable for the selected language.

11. The apparatus of claim 5, wherein the means for displaying the first set of text in the language font on a second preselected location comprises a key mapper, displayed by a computer on a video display, that includes keyboard images of keyboards corresponding to a plurality of language fonts.

12. The apparatus of claim 5, wherein the means for printing a label comprises a printer.

13. The apparatus of claim 12, wherein the printer comprises a thermal printer.

14. A method of printing bar coded labels, comprising:
   a. selecting a bar code standard from a plurality of bar code standards;
   b. entering into a computer data to be encoded as a first bar code in accordance with the selected bar code standard;
   c. displaying the first bar code in a first preselected location of a first portion of a video display having dimensions corresponding to a preselected label type;
   d. selecting a first language font from a plurality of language fonts;
   e. entering a first set of text into the computer; and
   f. displaying the first set of text in the first language font on a second preselected location, different from the first preselected location, of the portion of the video display.

15. The method of claim 14, wherein the text entering step is accomplished by using a key mapper software program that displays on a second portion of the video display, different from the first portion, a keyboard image that includes images of letters, in a selected language font selectable from a plurality of language fonts, displayed on images of key locations that correspond to the keys of the actual keyboard, so that when a key on the actual keyboard, corresponding to a key location showing a letter in the selected language font, is depressed, the label image will include the letter in the selected language appearing on the corresponding key location.

16. The method of claim 14, further comprising the step of printing a label, comprising the first bar code and the first set of text, so as to resemble the preselected portion of the video display.

17. The method of claim 14, further comprising the steps of:

a. entering into the computer data to be encoded as a second bar code; and b. displaying the second bar code in a third preselected location, different from the first and second preselected locations, of the portion of the video display.

18. The method of claim 17, further comprising the step of printing a label, comprising the first bar code, the first set of text and the second bar code, so as to resemble the preselected portion of the video display.

19. The method of claim 14, further comprising the steps of:

a. selecting a second language font from the plurality of language fonts; and b. entering a second set of text into the computer; and c. displaying the second set of text in the second language font on a fourth preselected location, different from the first and second preselected locations, of the portion of the video display.

20. The method of claim 19, further comprising the step of printing a label, comprising the first bar code, the first set of text and the second set of text, so as to resemble the preselected portion of the video display.

\* \* \* \* \*